United States Patent
Awad et al.

(10) Patent No.: US 6,701,049 B1
(45) Date of Patent: Mar. 2, 2004

(54) OPTICAL CLOCK RECOVERY DEVICE USING NON-LINEAR OPTICAL WAVEGUIDES

(75) Inventors: Ehab Awad, Hyattsville, MD (US); Julius Goldhar, Silver Spring, MD (US); Pak Shing Cho, Gaithersburg, MD (US); Christopher Richardson, Columbia, MD (US); Norman Moulton, Ellicott City, MD (US)

(73) Assignee: The United States of America as represented by The National Security Agency, Washington, DC (US)

( * ) Notice: Subject to any disclaimer, the term of this patent is extended or adjusted under 35 U.S.C. 154(b) by 53 days.

(21) Appl. No.: 10/249,201

(22) Filed: Mar. 21, 2003

Related U.S. Application Data

(60) Provisional application No. 60/366,678, filed on Mar. 22, 2002.

(51) Int. Cl.[7] .............................. G02F 1/35; H04B 10/12
(52) U.S. Cl. ...................... 385/122; 398/141; 398/155
(58) Field of Search .................................. 398/141, 154, 398/155; 385/122, 15, 27; 359/326, 332

(56) References Cited

U.S. PATENT DOCUMENTS

| | | | | |
|---|---|---|---|---|
| 5,446,573 A | * | 8/1995 | Lomashevitch et al. | 398/175 |
| 5,742,415 A | * | 4/1998 | Manning et al. | 398/52 |
| 5,757,529 A | * | 5/1998 | Desurvire et al. | 398/178 |
| 6,317,232 B1 | * | 11/2001 | Fee et al. | 398/9 |
| 6,501,591 B1 | * | 12/2002 | Kumar et al. | 359/330 |

* cited by examiner

*Primary Examiner*—John D. Lee
(74) *Attorney, Agent, or Firm*—Stephen M. Bloor

(57) ABSTRACT

All-optical timing extraction and optical clock recovery for high-speed return-to-zero binary optical data streams using the timing difference between clock and data counter-propagating optical pulses in a non-linear optical waveguide where the first pulse to arrive at the non-linear optical waveguide partially saturates the transmission properties of the waveguide resulting in a change of the transmission properties seen by the lagging pulse. A balanced photo-detector makes delay-dependent comparisons of the clock and data pulses' peak power and generates an error signal used in a phase-locked loop configuration to synchronize the clock to the data stream.

12 Claims, 3 Drawing Sheets

OPTICAL CLOCK RECOVERY DEVICE USING NON-LINEAR OPTICAL WAVEGUIDES

BACKGROUND OF INVENTION

1. Field of the Invention

This invention relates generally to optical communications systems, and more particularly to signal regeneration in optical repeater systems.

2. Description of the Related Art

In contemporary communication systems operating at ever-increasing transmission rates, return-to-zero (RZ) signaling has become a popular method for data exchange. In RZ signaling, a strong component of the clock frequency exists in the data spectrum, providing a reference on which a phaselocked loop (PLL)-based, or filter-based, clock recovery unit (CRU) can latch in order to recover the clock signal from the received data stream. Such PLL-based CRU systems are well studied and characterized in the technical literature.

At relatively low data transfer rates, a fundamental oscillator is commonly deployed in the PLL, and the recovered clock is obtained directly. At higher frequencies, fundamental high-Q oscillators are difficult to build, and are therefore costly, due to the reduction in resonator size. While a frequency doubler can be used, a more compact and relatively low power approach is to employ a harmonic mixer as the phase detector for the phaselocked loop.

Transmission of data over long fiber links results in timing jitter, which is a major signal degradation problem. The timing jitter refers to a random variation of the pulses' arrival time at the receiver, and it can be on the order of a pulse width. Often there is also a slow variation in the propagation time of the transmitted data caused by the change in the fiber refractive index due to temperature variation and mechanical disturbance. The jitter may cause slight changes in the repetition rate of the data at the receiver. In packet switching systems, the arrival time of the data packets is stochastic. Therefore, at a node or a receiver the timing of the data needs to be extracted and synchronized with a local clock that in turn drives the data processing devices, which perform other signal processing operations, such as optical demultiplexing or 3R (re-amplification, retiming, and reshaping) optical signal regeneration. This extraction of the data timing at the receiver is called clock recovery. As optical data transmission speeds approach 100 gigabits/second, a phase noise yielding less than 1 picosecond of clock timing jitter is required.

As described above, PLL circuits have been used in conventional clock recovery systems. When used in optical communications networks they convert received optical signals to electronic signals and then back to optical signals for transmission. Because high-Q oscillators are difficult to build and the operation speed and performance of the conventional electric PLL circuits are limited by the response of the phase comparators used, new techniques based on photonic solutions are required for high-speed optical communications networks.

SUMMARY OF INVENTION

An object of the present invention is to provide an all-optical timing extraction device using the non-linear characteristics of optical waveguides for counter-propagating pulses.

Another object of the present invention is to provide an all-optical timing extraction device that can resolve timing delays between pulses on the order of a few picoseconds.

Yet another object of the present invention is to provide an all-optical timing extraction device that is bit rate flexible.

In order to attain the objectives described above, according to an aspect of the present invention, there is provided an optical clock recovery device using non-linear optical waveguides whereby relative arrival timing differences between optical data and optical clock pulses counter-propagating in a non-linear waveguide are determined. The extracted timing information is used in conjunction with a balanced photodetector to generate electrical error signal. This error signal is used in a phase-locked loop configuration to perform optical clock recovery.

This invention is based on the non-linear optical properties of semiconductor waveguides. Any non-linear semiconductor waveguide can be used. Herein two different types of non-linear semiconductor waveguides devices, one reverse biased, to increase the optical absorption coefficient, and one forward biased, to increase the optical gain coefficient, are used as exemplars. The first is an electro-absorption modulator (EAM) and the other is semiconductor optical amplifier (SOA). These devices are usually fabricated from InGaAsP-based material and can operate in a wide range of wavelength including the 1310 or 1550 nm telecommunication wavelength window. The EAM is usually reverse biased with a fixed dc voltage to increase the optical absorption coefficient inside its wave-guide. While a forward dc current is used to bias the SOA and increase the optical gain coefficient inside its wave-guide.

These waveguides have nonlinear transmission characteristics that can be controlled optically. When an intense optical control pulse propagates through the EAM, electron-hole pairs are generated from inter-band absorption. The electron-hole pair drifts apart from each other in responds to the internal dc electric field. As a result, an opposite space charge is established which reduces the internal dc electric field which in turns decreases the absorption in the waveguide. Therefore, the optical control pulse saturates the EAM absorption resulting in an increase In its transmission. Correspondingly, when an intense optical control pulse propagates through the SOA, stimulated emission diminishes the electron population and thus reduces the optical gain inside the waveguide. Therefore, the optical control pulse saturates the SOA gain resulting in a decrease in its transmission.

When two counter-propagating pulses with sufficient peak powers are injected into a nonlinear waveguide, they will both contribute to its transmission saturation. The amount of saturation will depend on the timing difference (delay) between the arrivals of the two pulses. The leading pulse, acting like the control pulse, saturates the loss and increases the transmission in the case of an EAM, or saturates the gain and decreases the transmission in the case of an SOA, seen by the lagging pulse. Therefore, the transmission of the lagging pulse is usually higher in the case of an EAM, or lower in the case of an SOA, than that of the leading pulse.

Given that the nonlinear device has two possible outputs, one for each counter-propagating pulse steam, a delay-dependent peak power transmission for each output is measured for the non-linear semiconductor wave-guide device. This phenomenon is well documented by E. S. Awad, C. J. K. Richardson, P. Cho, N. Moulton, J. Goldhar in "Optical Clock Recovery Using SOA For Relative Timing Extraction Between Counter-Propagating Short Picosecond Pulses,"

IEEE Photon. Tech. Lett., vol. 14, no. 3, March 2002 and in "Bi-Directional Coupling In Nonlinear Waveguides ForAbsolute Timing Determination," presented at CLEO 2001 Technical Digest, Baltimore, Maryland, poster session CThL51, which are both hereby incorporated by reference in their entirety.

Based on this principle, two optical beams with the same or different wavelengths or polarizations are launched simultaneously into a, typically fiber-pigtailed, nonlinear semiconductor waveguide device in a counter-propagating configuration. The first beam, here the data, is a pulse train encoded with RZ binary digital information, typically using amplitude shift keying. The second beam, here the clock, is a stable pulse train produced by an optical short pulse source (OPS) with a repetition frequency close to that of the data and a very low timing jitter. The amount of transmission change, however, depends on the relative delay between the data and clock signals inside the device. Therefore, the transmitted power of the data and clock signal depends critically on the relative arrival timing of the two pulses inside the waveguide.

The transmitted clock and data optical signals are then split off and detected by a balanced photo-detector to measure the difference between the average optical powers of the non-linear semiconductor wave-guide device data and clock outputs, and produce an electrical error signal at the detector's output. The balanced photodetector is slow enough to average the power over several pulses to detect an average clock—this is in effect a low-pass filter. The polarity of the generated error signal indicates which pulse stream advances the other, while the amplitude of the error signal indicates the amount of the delay between the two pulse streams. The error signal provides complete information about the timing error between the data and clock pulses. This timing error is then compensated for by proper tuning of the frequency and phase of the OPS.

This error signal may be provided directly to the OPS but in more typically configurations, this error signal is fed back through an electronic amplifier to the voltage-controlled oscillator (VCO) input to adjust its repetition rate. The VCO in turn drives the OPS to adjust its repetition frequency. The repetition rate and phase of the OPS stabilize only when the clock and the data are synchronized.

The aforementioned features, objects, and advantages of this method over the prior art will become apparent to those skilled in the art from the following detailed description and accompanying drawings.

DETAILED DESCRIPTION

Figure 1:
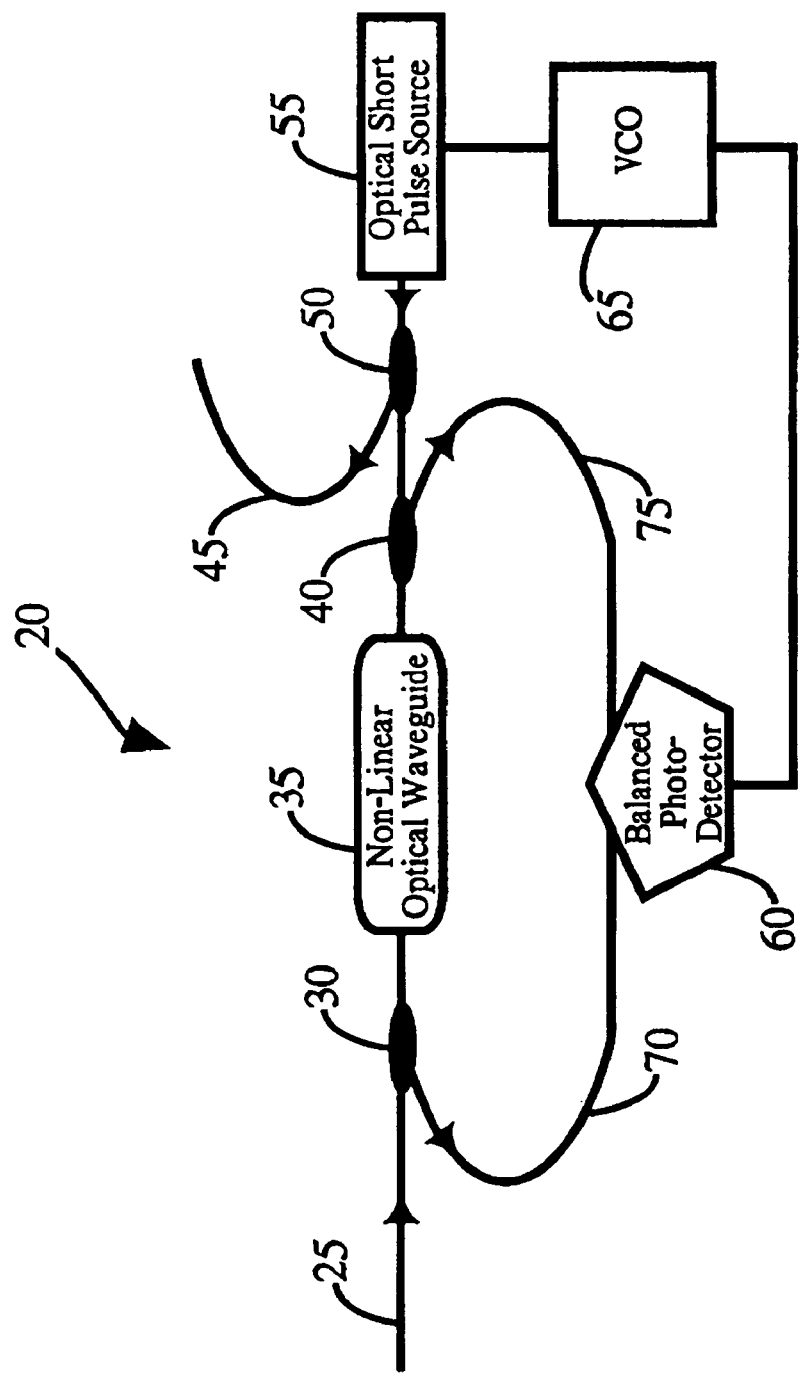
FIG. 1 is a schematic diagram showing one embodiment of the Optical Clock Recovery Device Using Non-linear Optical Waveguides.
Figure 2:
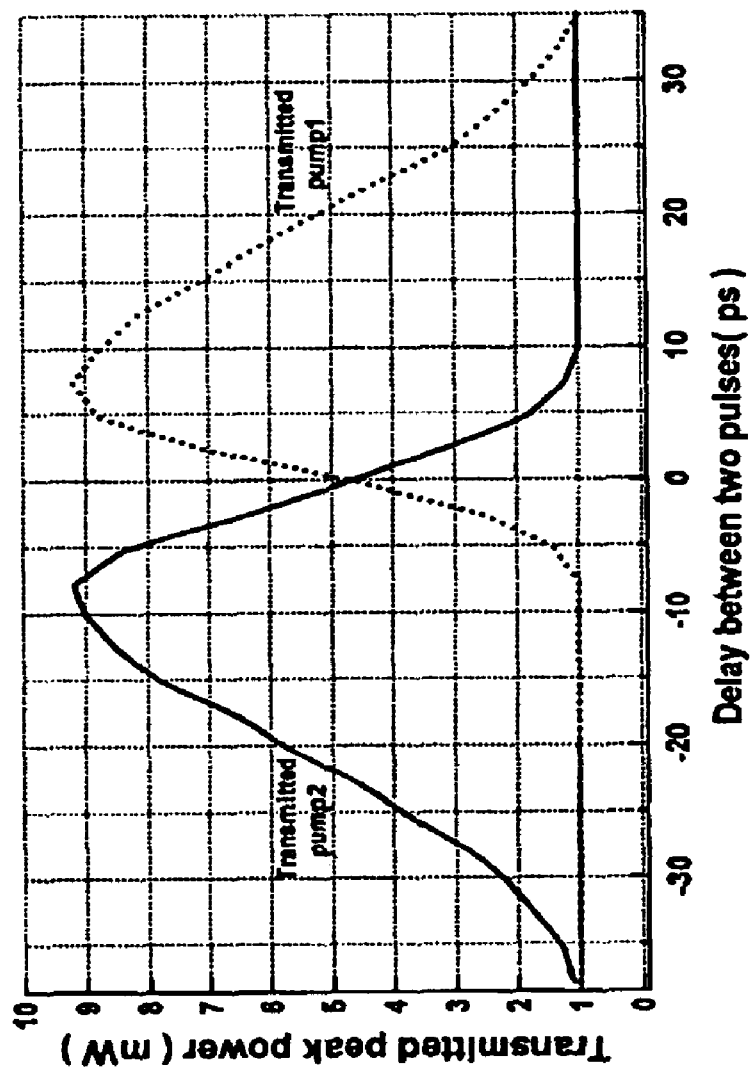
FIG. 2 is a graph of the transmitted peak power for the clock (pump 1) and data (pump 2) outputs of an exemplar non-linear optical waveguide as a function of timing delay between clock and data pulses.

One embodiment of the optical clock recovery device using non-linear optical waveguides 20 is shown in FIG. 1. A sample of, typically stochastically arriving data packets, in a high-speed return-to-zero (RZ) binary optical pulse data stream (optical data or pulse data stream), is received on the sample data input 25. The sample data input 25 is optically connected to the non-splitting output (output) of a first optical splitting coupler 30. Because the sample data input is connected to an output, instead of an input of the first optical splitting coupler 30, the optical data propagates through the first optical splitting coupler 30, in a direction opposite that designed for energy splitting, without interference.

The first 30 and, later discussed, second 40 optical splitting coupler and OPS output coupler 50 (couplers) split off a portion of the optical energy propagating in their direction of operation (input to output) into a coupled loop, the OPS coupled loop 70 in the case of the first optical splitting coupler 30, the data coupled loop 75 in the case of the second optical splitting coupler 40, and the OPS output loop in the case of the OPS output coupler 50. Energy not split off into a coupled loop 45, 70, 75 propagates through to the coupler's 30, 40, 50 output. Energy propagating through the couplers 30, 40, 50 in the direction opposite their operation (output to input) is minimally affected. In typical embodiments the couplers 30, 40, and 50 used are referred to in the art as directional couplers with splitting or tapping ratio such as 50/50 (even split), 90/10, or 80/20.

A non-linear optical waveguide (waveguide) 35 has two optical ends, a first end and a second end. Optical energy provided at the first end is transmitted to the second end and conversely energy provided at the second end is transmitted to the first end. The input of the first optical splitting coupler 30 is optically connected to a first end of the waveguide 35 causing the optical data to transit and exit the waveguide 35 at its second end.

The second end of the waveguide 35 is connected to the input of the second optical splitting coupler 40 causing the optical data to propagate through the second optical splitting coupler 40 in its direction of operation. A portion of the optical energy making up the optical data is split off onto the data coupled loop 75.

A rate adjustable OPS (OPS) 55 produces a steady optical pulse stream (clock or clock pulse stream) at the nominal data rate of the optical data and has an optical output connected to the input of the OPS output coupler 50. This clock pulse stream propagates through the OPS output coupler 50, in its direction of operation, splitting off a portion of the energy in the clock pulse stream onto the OPS output loop 45. The output of the OPS output coupler 50 is connected to the output of the second optical splitting coupler 40 causing the clock pulse stream to propagate through, and exit the input of, the second optical splitting coupler 40 in a direction opposite its direction of operation, without interference.

As detailed above, the input of the second optical splitting coupler 40 is connected to the second end of the waveguide 35, which in turn is connected by its first end to the input of the first optical splitting coupler 30 causing the clock pulse stream to propagate through the non-linear optical waveguide 35 in a direction opposite that of the direction of propagation of the optical data. After transiting the non-linear optical waveguide 35, the clock pulse stream propagates through the first optical splitting coupler 30, in its direction of operation, input to output. The first optical splitting coupler 30 splits of a portion of the clock pulse stream energy onto the OPS coupled loop 70.

Any non-linear optical semiconductor wave-guide material can be used as the active element in the non-linear optical waveguide 35. The material chosen should be such that at the clock and data pulse amplitudes chosen, the semiconductor will saturate on the order of a pulse width and recover on the order of the bit period so that the leading pulse will saturate the non-linear optical waveguide 35 for either absorption or gain and the lagging pulse will be affected during the period of saturation or saturation recovery so that the amount of lag can be discerned using this time-delay-dependent-saturation effect.

The choice of materials used to construct the non-linear optical waveguide 35 and the electrical bias imparted thereupon cause the device to either have an increased optical absorption or gain coefficient. The two exemplars non-linear optical waveguide 35 devices, discussed above, are used in two common preferred embodiments; one having increased optical absorption and the other increased optical gain. In the first embodiment, the non-linear optical waveguide 35 is an electro-absorption modulator (EAM) and in the second is a semiconductor optical amplifier (SOA). The EAM is reverse biased with a fixed direct current (dc) voltage to increase the optical absorption coefficient inside non-linear optical waveguide 35 in the first embodiment, while a forward dc current is used to bias the SOA and increase the optical gain coefficient inside the non-linear optical waveguide 35 in the second embodiment.

When an optical control pulse of sufficient magnitude propagates through the non-linear optical waveguide 35 (EAM) in the first embodiment it saturates the non-linear optical waveguide's 35 absorption resulting in an increase in the transmission of subsequent pulses through the non-linear optical waveguide 35. Correspondingly, when an optical control pulse of sufficient magnitude propagates through the non-linear optical waveguide 35 (SOA) in the second embodiment it saturates the non-linear optical waveguide's 35 gain resulting in a decrease in the transmission of subsequent pulses through the non-linear optical waveguide 35. Therefore, either device can function as an optically controlled nonlinear optical modulator, as the optical control pulse (leading pulse) changes the non-linear properties of the non-linear optical waveguide 35, such as its carrier population inside the device active waveguide medium, and thus it alters its transmission characteristics.

In the present invention the optical pulse data stream and clock pulse stream are configured to propagate through the non-linear optical waveguide 35 in opposite directions. When two counter-propagating pulses with sufficient peak powers from the optical pulse data stream and clock pulse stream are injected into non-linear optical waveguide 35, they both contribute to its gain or absorption transmission saturation. The amount of this saturation will depend on the timing difference (delay) between the arrivals of the two pulses at their respective ends of the non-linear optical waveguide 35. The leading pulse saturates the loss and increases the transmission, or saturates the gain and decreases the transmission, through the non-linear optical waveguide 35 seen by the lagging pulse. Therefore, the transmission of the lagging pulse is affected, either positively or negatively depending on the non-linear optical waveguide 35 used, by the timing difference between it and the leading pulse. The transmitted power of the pulse data stream and clock pulse stream depends critically on the relative arrival timing of the two pulses inside the non-linear optical waveguide 35.

After the optical pulse data stream and clock pulse streams have counter-propagating through the non-linear optical waveguide 35 and had their relative power affected by their relative timing difference, portions of their remaining power are split off onto the data coupled loop 75 and OPS coupled loop 70, respectively. The data coupled loop and OPS coupled loop are connected, one each to one of the two balanced inputs of a balanced photo-detector 60. The balanced photo-detector 60 measures the difference between the average optical powers of the optical pulse data stream and clock pulse streams, and produces an electrical discriminator error signal at its output. The bandwidth of the balanced photo-detector 60 is commensurate with the pulse averaging time required to produce the electrical discriminator error signal. Such a bandwidth, for example, can be in the range of kilo-Hertz for a clock rate of 10 GHz. The polarity of the balanced photo-detector 60 generated error signal indicates which pulse stream, the optical pulse data stream or clock pulse stream, advances the other, while the amplitude of the error signal indicates the amount of the delay between the two pulse streams. The error signal provides complete information about the timing error between the optical pulse data stream and clock pulse stream.

The output of the balanced photo-detector 60 is electrically connected to the repetition-rate-adjustable optical short pulse source (OPS) 55. The OPS 55 with its output optical clock rate adaptively tuned in accordance with the generated error signal received from the output of the balanced photo-detector 60 creates an opto-electronic phase-lock loop. This opto-electronic phase-lock loop configuration causes the OPS 55 rate and phase to stabilize when the clock pulse stream and optical pulse data stream are synchronized. The OPS output loop 45, in splitting off a portion of the energy in the clock pulse stream, provides a clock recovery optical output in accordance with the objectives of this invention.

In typical embodiments this configuration is such that the balanced photo-detector 60 generated error signal is electrically connected to and drives a voltage-controlled oscillator (VCO) 65. The VCO 65 is electrically connected to and drives, for example, a mode-locked laser that constitutes the OPS 55.

Figure 3:
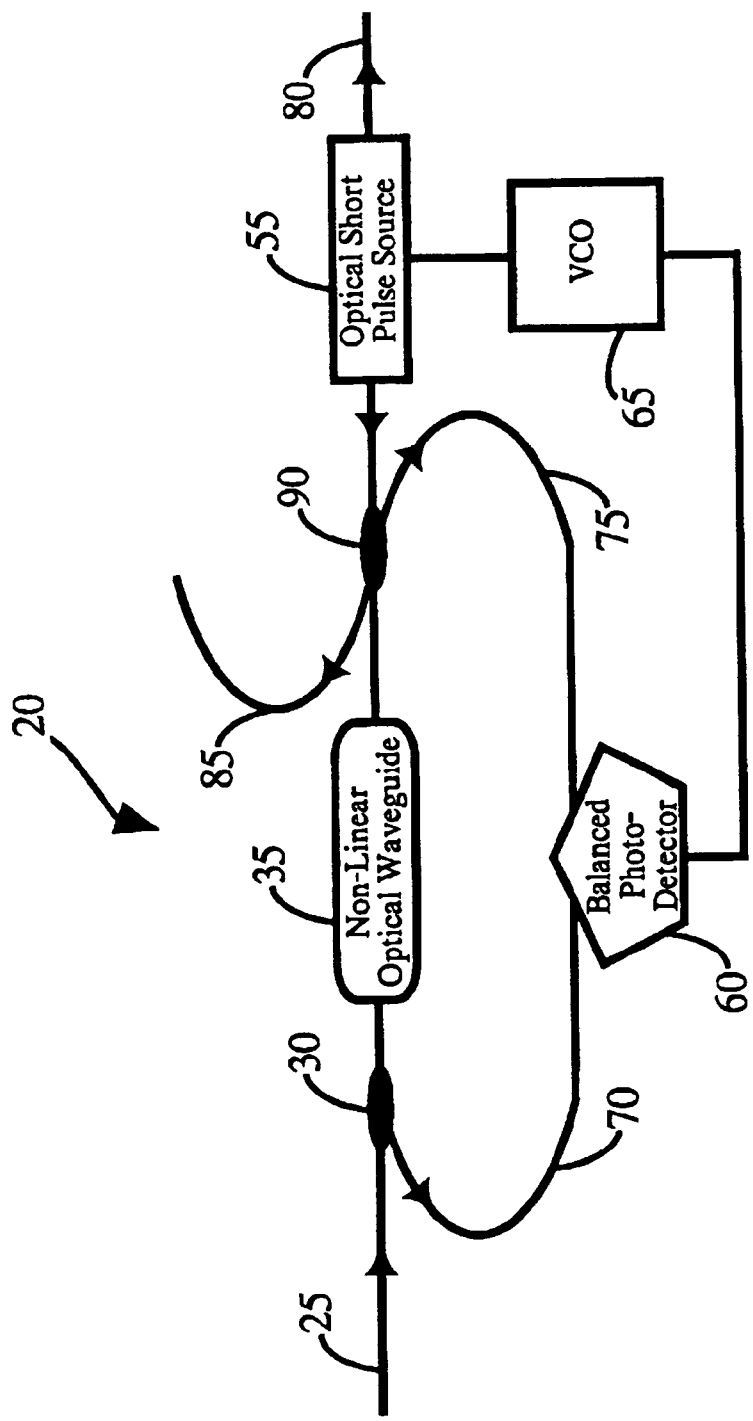
FIG. 3 is a schematic diagram showing another embodiment of the present invention.

For cost savings and implementation simplicity, the optical clock recovery device using non-linear optical waveguides 20 discussed above will combine some of the components as depicted in FIG. 3. Here the second optical splitting coupler 40 and OPS output coupler 50 functions have been combined into a bi-directional coupler 90. The bi-directional coupler 90 has two directions of operation, two inputs, and two outputs. The OPS 55 optical output is connected to the bi-directional coupler's 90 first input which causes the OPS's 55 clock pulse stream to propagate through the bi-directional coupler 90, exit its second input, and enter the second end of the waveguide 35. A portion of the clock pulse stream is split off and is available, as a clock recovery optical output, on the bi-directional coupler's 90 output loop 85, in accordance with the objectives of this invention. Similarly, the pulse data stream exits the second end of the waveguide 35 and enters the second input of the bi-directional coupler 90, where some portion of the energy in the stream exits through the first input and some portion is coupled onto the data coupled loop 75.

The clock recovery optical output can be coupled out of the device 20, from the OPS 55 clock pulse stream, at any convenient point, preferably before the clock pulse stream is affected by the waveguide 35. As an alternate embodiment, the OPS 55 may have a second optical output 80, which provides a clock recovery optical output. This second optical output 80 may be used in addition to, or instead of, the OPS output loop 45 or output loop 85.

Although various preferred embodiments of the present invention have been described herein in detail to provide for complete and clear disclosure, it will be appreciated by those skilled in the art, that variations may be made thereto without departing from the spirit of the invention or the scope of the appended claims.

What is claimed is:

1. An optical clock recovery device, comprising:
   a) a first optical splitting coupler, having an optical input, an optical output, and a coupled optical output, where said optical output is configured to receive a sample pulse data input of some data rate;
   b) a non-linear optical waveguide, having a first and a second optical end, wherein said first optical end is optically connected to the optical input of the first optical splitting coupler;
   c) a bi-directional coupler, having an first and second optical input and a first and second optical output, where said second optical input is optically connected to the second optical end of the non-linear optical waveguide and said first optical output provides an optical clock recovery output;
   d) a balanced photo-detector, having a first and a second balanced input and an electrical discriminator output, where the coupled optical output of the first optical splitting coupler is optically connected to the first balanced input and the second optical output of the bi-directional coupler is optically connected to the second balanced input;
   e) a rate adjustable optical short pulse clock, having an optical clock pulse output at an adjustable clock rate, optically connected to the first optical input of the bi-directional coupler, and an electrical clock rate adjustment input responsive to direct current voltages for adjusting the clock rate; and
   f) means for causing the electrical clock rate adjustment input of the rate adjustable optical short pulse clock to be responsive to the electrical discriminator output of the balanced photo-detector such that the clock rate synchronizes with the data rate of the sample pulse data input.

2. The optical clock recovery device of claim 1, wherein the bi-directional coupler further comprises:
   a second optical splitting coupler, having an optical input, an optical output, and a coupled optical output, where said optical input is optically connected to the second optical end of the non-linear optical waveguide; and
   a third optical splitting coupler, having an optical input, an optical output, and a coupled optical output, where said optical input is optically connected to the optical clock pulse output of the rate adjustable optical short pulse clock, the optical output is optically connected to the optical output of the second optical splitting coupler, and the coupled optical output provides an optical clock recovery output.

3. The optical clock recovery device of claim 1, wherein the rate adjustable optical short pulse clock further comprises at least one mode-locked laser.

4. The optical clock recovery device of claim 1, wherein the means for causing the electrical clock rate adjustment input of the rate adjustable optical short pulse clock to be responsive to the electrical discriminator output of the balanced photo-detector further comprises a voltage-controlled oscillator, having a voltage-control input and an oscillator output, wherein the voltage-control input is connected to and responsive to the electrical discriminator output of the balanced photo-detector and the oscillator output is used to drive the rate adjustable optical short pulse clock.

5. The optical clock recovery device of claim 1, wherein the non-linear optical waveguide is constructed and electrically biased so as to have an increased optical gain coefficient.

6. The optical clock recovery device of claim 1, wherein the non-linear optical waveguide is constructed and electrically biased so as to have an increased optical absorption coefficient.

7. The optical clock recovery device of claim 1, wherein the non-linear optical waveguide further comprises an electro-absorption modulator.

8. The optical clock recovery device of claim 1, wherein the non-linear optical waveguide further comprises a semiconductor optical amplifier.

9. The optical clock recovery device of claim 1, wherein the balanced photo-detector has a bandwidth slow enough to average power over more than one pulse of said sample pulse data input and optical pulse output.

10. The optical clock recovery device of claim 1, wherein the optical wavelengths of said sample pulse data input and said optical pulse output are the same.

11. The optical clock recovery device of claim 1, wherein the optical wavelengths of said sample pulse data input and said optical pulse output are the different.

12. The optical clock recovery device of claim 1, wherein the rate adjustable optical short pulse clock further comprises a second optical clock pulse output which provides an optical clock recovery output.

* * * * *